United States Patent [19]

Sakaguchi et al.

[11] Patent Number: 4,828,196
[45] Date of Patent: * May 9, 1989

[54] DEVICE FOR WINDING MAGNETIC TAPE USING MAGNETIC ALIGNMENT

[75] Inventors: Masaaki Sakaguchi; Seiji Kiuchi, both of Kanagawa, Japan

[73] Assignee: Fuji Photo Film Co., Ltd., Kanagawa, Japan

[*] Notice: The portion of the term of this patent subsequent to Nov. 8, 2005 has been disclaimed.

[21] Appl. No.: 35,331

[22] Filed: Apr. 7, 1987

[30] Foreign Application Priority Data

Apr. 7, 1986 [JP] Japan .............................. 61-50786[U]

[51] Int. Cl.⁴ ...................... B65H 27/00; G11B 23/00
[52] U.S. Cl. ................................. 242/67.1 R; 242/76; 226/93
[58] Field of Search ....................... 242/67.1 R, 76, 78, 242/78.1, 179, 186; 226/93-97; 360/66

[56] References Cited

U.S. PATENT DOCUMENTS 3,849,794  11/1974  Arimura et al. ................. 242/76 X
4,343,441  8/1982  Graham ............................. 242/68.1
4,512,527  4/1985  Rehklau et al. .................. 242/56 R

FOREIGN PATENT DOCUMENTS 51-64286  3/1986  Japan .

OTHER PUBLICATIONS

"Rare Earth Magnets Improve Response in Linear Actuators" *Control Engineering* vol. 24, No. 11. pp. 56-58. (Nov. 1977).

*Primary Examiner*—Stuart S. Levy
*Assistant Examiner*—Steven M. duBois
*Attorney, Agent, or Firm*—Sughrue, Mion, Zinn, Macpeak, and Seas

[57] ABSTRACT

A tape winding apparatus for a magnetic tape in which a permanent magnet applies a magnet field to the magnetic tape as it is being wound on a take-up reel. The permanent magnet is of the rare earth type being made of such materials as Sm-Co or Nd-Fe-B of annular form, small in size, coaxial to the wound tape and adjacent to the side thereof, and of high field intensity.

1 Claim, 6 Drawing Sheets

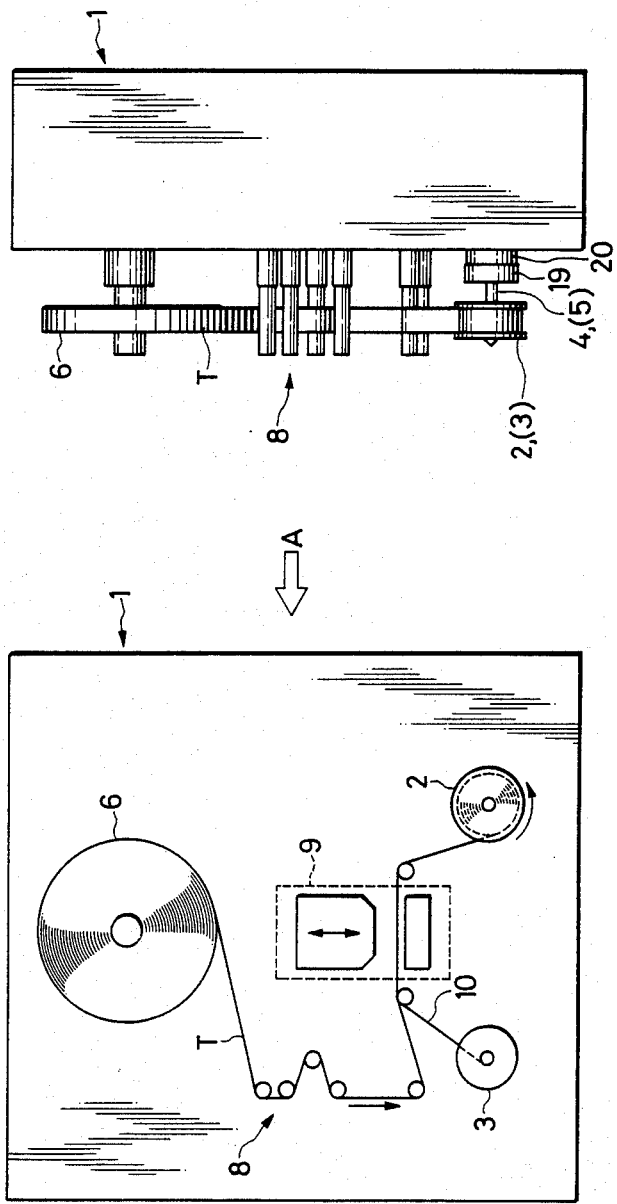

DEVICE FOR WINDING MAGNETIC TAPE USING MAGNETIC ALIGNMENT

BACKGROUND OF THE INVENTION

1. Field of the Invention

The present invention relates to a method and a device for winding a magnetic tape, such as winding a magnetic tape of prescribed length from a source roll of a magnetic tape to a small tape winding body, rewinding a magnetic tape from a tape winding body to another tape winding body, winding a magnetic tape of large width for a source "roll", and winding a magnetic tape of large width to a plurality of tape winding bodies while slitting the tape.

2. Background of the Invention

A process of manufacturing a magnetic tape such as an audio casette tape, a video cassette tape, a memory tape or a broadcasting video tape includes a step of winding a magnetic tape of prescribed length from a source roll of a large-length tape to a small tape winding body such as a reel and a hub, a step of rewinding a magnetic tape from a tape winding body to another tape winding body, a step of winding a magnetic tape of large width as a source tape, a step of winding a magnetic tape slit from another magnetic tape, and so forth. When the magnetic tape is wound on the tape winding body in the process of the winding or the rewinding, the tape may vibrate in the direction of the thickness of the tape and this vibration can fluctuate due to the physical properties of the magnetic tape and those of the tape winding body so that each side edge of the tape wound on the winding body is unneatly overlaid on itself. The higher that the speed of the winding is, the more unneatly the side edge is overlaid on itself.

A magnetic tape whose side edge is unneatly overlaid on itself as described above has problems that the external appearance of the wound tape housed as a commercial product in a magnetic tape cassette is bad. Furthermore, the side edge is likely to be damaged resulting in various troubles such as the deterioration of the electromagnetic converting properties of the tape. The unneat overlaying is a serious drawback, particularly for a magnetic video tape for high-density recording, because an audio signal or a tuning signal is recorded near the side edge of the tape. For these reasons, in a conventional process of manufacturing a magnetic tape, the wound states of all magnetic tapes are visually inspected or the like after a winding process or a rewinding process. Since the inspection takes much time and money, the inspection is a major disadvantage in the magnetic tape manufacturing process.

Conventional systems, which are shown in FIGS. 1 and 2 and which accomplish what is called neat winding, have been adopted to wind a magnetic tape of low neat-winding yield in order to improve the wound state of the tape to reduce the necessity of its inspection. FIGS. 1 and 2 show perspective schematic views of tape winding bodies 2 and the vicinity thereof.

In the conventional system shown in FIG. 1, an endless flexible belt 11 made of rubber, polyimide or the like and rotatably supported by rollers 12, 13 and 14 is revolved together with the magnetic tape T and elastically pushes the magnetic side of the tape under relatively high pressure in the radial direction of the tape winding body 2 to neatly wind the tape.

In the conventional system shown in FIG. 2, a belt 15 made of a relatively soft nonwoven fabric or the like is provided between one flange of the tape winding body 2 and one side edge of the magnetic tape T to push the side edge of the tape T under relatively high pressure while the belt is supported by a roller 17 or the like and wound at a low constant speed from a belt send-out member 16 to a belt winding member 18 so as to neatly wind the tape.

However, since the belts 15 are placed in direct contact with the magnetic tape T in the above-mentioned system, there are various problems that the magnetic layer of the tape T is worn or the fibers of the nonwoven fabric come off to locally hinder recording on the tape T, inappropriate pressure acts to deform the tape or damage its side edge, and so forth. For that reason, the system does not function properly. In addition, since the wear and tear of the neat winding system is large, it has disadvantages with regard to its cost and maintenance as well. The constitution of each of the system needs to be such that the tape winding body 2 is moved between at least a working position and a non-working position when it is replaced. The constitution makes a magnetic tape winding device complicated and renders it relatively time-consuming to replace the tape winding body 2. The period of time required for the movement of the tape winding body 2 hinders the enhancement of productivity.

Two systems for winding a magnetic tape for a cassette are used today. One of them is an open winding system in which the tape is neatly wound and then inserted into the cassette as so to be finished product. The other is an in-cassette winding system which is also called C-O winding system or V-O winding system and in which the tape is wound at the final stage of assembly of the cassette.

As for the in-cassette winding system, as shown in FIG. 3, the cassette 23 without the magnetic tape is first assembled, an outgoing tape winding body 2 and an incoming tape winding body 3 which are coupled to each other by a leading tape 10 are inserted into the cassette 23 and screws are tightened so as to provide a unfinished product generally called V-O, C-O or the like. In the unfinished product, the leading tape 10 is partly pulled out by an in-cassette winder and cut in half. The front end of the magnetic tape T is spliced to one cut-off end of the leading tape 10 whose other cut-off end is held a suction member 22. The tape winding body 2 having the leading tape spliced to the magnetic tape is rotated to wind the magnetic tape on the body 2 by a prescribed length. The magnetic tape T is then cut off. The rear end of the magnetic tape T wound on the winding body 2 is then spliced to the other cut-off end of the leading tape 10, thus finishing the product. Since the wound state of the magnetic tape T entirely depends on the physical properties of the tape T and the accuracy of the assembly of the cassette 23, the wound state cannot be well controlled. For that reason, the yield of well-wound magnetic tapes is low. In order to increase the yeild, a roller 24, shown in FIG. 4, having an upper and a lower flanges 25 has been provided on a trial basis to apply a force to the magnetic tape in the direction of its width to push the tape T sideward. However, if the force is strong, the side edge of the tape is more likely to be damaged. If the force is weak, it hardly serves to neatly wind the tape. All in all, no effective means have been available to improve the wound state of the tape.

Meanwhile, a magnetic tape winding device was recently proposed in the Japanese Patent application (OPI) No. 51642/86 (the term "OPI" as used herein means an "unexamined published application"). In the device illustrated in FIG. 5, a winding drive shaft 30 is removably coupled to the winding hub 41 of a winding reel 42 comprising the hub and a flange 42. At least one magnet 31 is provided to face the wound side edge of a magnetic tape across the flange 42 while the tape is wound on the reel 40 so as to improve the wound state of the tape. However, the magnet 31 provided around the shaft 30 has a problem that the wound state of the tape is worse at its central portion near the winding hub 41 than at the peripheral portion of the tape. That is because the form of the magnet 31 is limited by the shaft 30. The magnet 31 is made annular so that the directions of the lines of magnetic force thereof are nonuniformly distributed near the central portion of the winding reel 40 due to the hollow central portion of the magnet. The magnetic flux density near the center of the reel 40 is so low that the magnetic force which pulls the magnetic tape T toward the flange 42 is unstable and weak at the initial stage of the winding of the tape. There has been disclosed in Japanese Patent application (OPI) No. 16886/86, and Japanese Utility Model Applications Nos. 48899/86 and 48900/86, combined into U.S. Patent Application Ser. No. 8040, filed Jan. 29, 1987, a tape winding device in which a magnetic field is applied in the direction of the thickness of the tape.

Further, it has been impossible to use the device shown in FIG. 5 with a take-up reel which has no flange. Further, at present, the magnet actually used is generally made from alnico or ferrite. When a good wound state is to be obtained with using such a magnet, it has been disadvantageous in that the magnet is unsuitably large in size to thereby require a large installation and a high cost.

SUMMARY OF THE INVENTION

The present invention was made in consideration of the above-mentioned circumstances in order to provide a device for neatly winding a magnetic tape even if the physical properties of the tape are irregular.

Accordingly, it is an object of the present invention to provide a device for neatly winding a magnetic tape, without complicating the device and deteriorating the quality of the tape as in the above-described neat winding systems, so as to improve the properties of the winding process.

It is another object of the present invention to provide a device for winding a magnetic tape so as to greatly improve the wound state of the tape in the incassette winding system.

The present invention is directed to a magnetic tape winding device for winding a magnetic tape onto a tape winding body while rotating the tape winding body. The tape winding device comprises at least one rare-earth permanent magnet provided at least in the vicinity of the tape winding body for generating a magnetic field passing through the tape winding body.

In short, under the condition that a magnetic tape is wound on a tape winding body disposed in a magnetic field generated by a rare-earth magnet being large in maximum energy product, the appearance of the wound magnetic tape can be made good. Furthermore, the winding of the magnetic tape can be satisfactorily carried out by use of a small-size magnet without requiring a large-sized magnet even in the case where the intensity of the magnetic field should be relatively large.

A material of a Sm-Co group or an Nd-Fe-B group is used for as rare-earth permanent magnet. Because the maximum energy product of the rare-earth magnet is larger than that of a conventionally generally used magnet, such as an alnico magnet or a ferrite magnet, the rare-earth magnet can generate a strong magnetic field even when it is small-sized, and therefore the winding device can be miniaturized.

BRIEF DESCRIPTION OF THE DRAWINGS

FIG. 6 is a schematic front view of an embodiment of the tape take-up apparatus in accordance with the present invention;

FIG. 7 is a schematic side view of the tape take-up apparatus of FIG. 6;

DETAILED DESCRIPTION OF PREFERRED EMBODIMENTS

Figure 1:
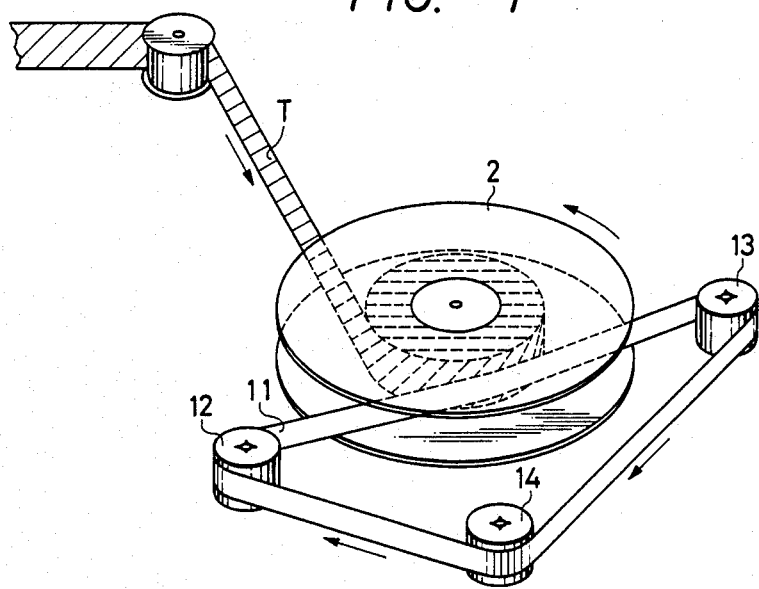
FIGS. 1 and 2 are schematic perspective views respectively showing a part of a conventional winding device.
Figure 2:
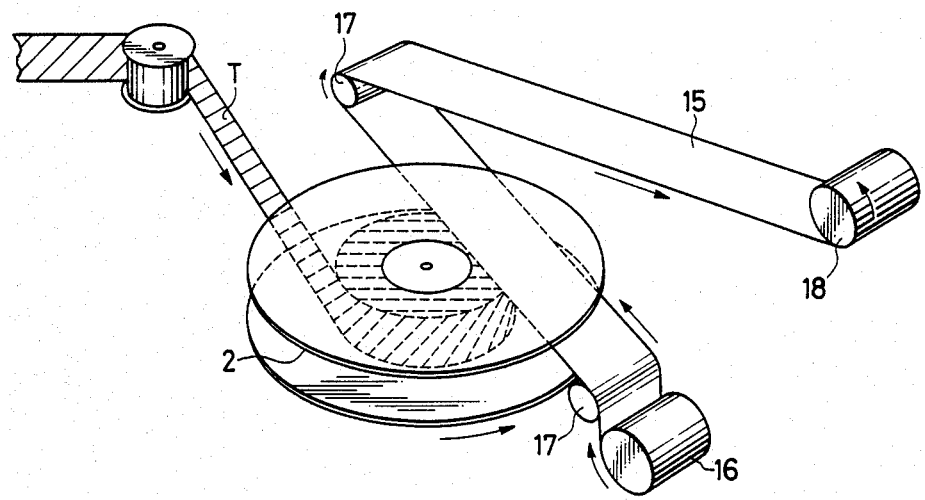

An embodiment of the tape winding device according to the present invention will be described in detail hereunder with reference to the drawings.

FIG. 6 is a schematic front view of an embodiment of the magnetic tape take-up apparatus according to the invention and FIG. 7 is a view from the arrow A of FIG. 6. For example, the take-up apparatus 1 is used in a method in which a magnetic tape T is wound on a pair of tape winding bodies 2 and 3 (hereinafter referred to as "tape reels") to be incorporated in a video tape cassette.

In the following, the general operation of the take-up apparatus 1 is described.

At first, the tape reels 2 and 3 are connected by a leader tape 10 having a predetermined length (half of which is illustrated in FIG. 6). After the tae reels 2 and 3 are respectively mounted onto rotary shafts 4 and 5 to be rotationally driven in the take-up apparatus, the leader tape 10 is cut off in its middle. The cut end of one part of the leader tape 10 connected to the tape reel 2 is spliced through a bonding tape or the like to a forward end of a coiled raw magnetic tape 6 mounted in advance. The magnetic tape T is taken up by a predetermined length on the tape take-up reel 2 and then is cut off. Thereafter the cut end of the magnetic tape T wound on the tape take-up reel 2 is spliced to the other cut end of the other part of the leader tape 10 connected to the tape reel 3.

The cutting of the leader tape 10 and the magnetic tape T and the bonding between the leader tape 10 and the magntic tape T are carried out by cutting and bonding means 9 provided with a tape end holding member, a cutter, a bonding tape, and so on. The magnetic tape T fed from the tape 6 is wound on the tape take-up reel 2 through a transport system 8 comprising guide pins, and guide rollers. The cutting and bonding means 9 are not shown in FIG. 7.

Although the above description is applicable to the conventional apparatus, the apparatus according to the invention is featured in the mount portion of the tape take-up reel 2 or, in other words, is featured in that a doughnut-like rare-earth permanent magnet 19 is provided in the vicinity of the tape reel 2 for taking up the magnetic tape T and on the side of the apparatus body along the reel shaft.

In this embodiment, the rare-earth permanent magnet is made of a material of a Sm-Co group. The maximum magnetic energy product of the rare-earth magnet takes a large value of from 20 to 30 MGOe, compared with the fact that the maximum magnetic energy product of a conventionally generally used permanent magnet, such as an alnico magnet or a ferrite magnet, is 5 MGOe. Accordingly, the permanent magnet 19 can generate a strong magnetic field even when it is small in size and thin in thickness.

Furthermore, the permanent magnet of an Sm-Co group rare-earth material may be replaced by a permanent magnet of a Nd-Fe-B group rare-earth material. Because the maximum magnetic energy product of the permanent magnet of an Nd-Fe group rare-earth material is 50 MGOe and is far larger than that of the permanent magnet of a Sm-Co group rare-earth material, it is possible to make the magnet smaller in size and thinner in thickness.

Figure 8:
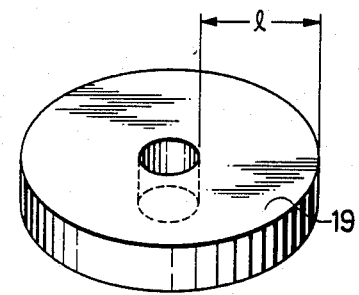
FIG. 8 is an enlarged perspective view of the permanent magnet depicted in FIG. 7.

The permanent magnet 19 shaped like a doughnut, as shown in FIG. 8, is provided around the rotary shaft 4 fitted to the center hole of the tape reel 2 for taking-up the magnetic tape T. The permanent magnet 19, for example, which is attached to the body of the take-up apparatus 1 by a support 20, is disposed near a flange 2a of the tape reel 2. The permanent magnt 19 is substantially equal in diameter to the tape take-up reel 2. Preferably, the length 1 of the permanent magnet 19 as shown in FIG. 8 is more than the width of the tape to be wound. The magntic field of the permanent magnet 19 is made substantially to be in the direction of the shaft 4. This annular structure for the magnet in a tape winding device has been disclosed in commonly assigned U.S. Patent Application Ser. No. 008040, filed Jan. 29, 1987 although the magnet composition of the present invention is not disclosed therein.

The rotary shaft 4 is coupled with a driving means 21, such as a motor or the like, and is driven to rotate by the driving means 21.

When the magnetic tape T is wound by the tape take-up constructed as described above, the magnetic tape T is wound on the take-up tape reel 2 while being attracted toward the permanent magnet 19 so that one edge of the tape is made to come in contact with a magnet-side flange 2a. Furthermore, the whole of the tape thus wound on the tape reel 2 is subject to the force of magnetic field so that the tape is kept in a stable state. Accordingly, with no mechanical contact, force can be applied by the magnetic field to the magnetic tape T having magnetic material at its surface. As the result, the magnetic tape T can be wound in a very good condition without disorder in the direction of tape width. Particularly, when the magnetic tape is wound at a high speed, air is rolled in together with the magnetic tape T layer to thereby form an air layer between a tape layer which is currently being wound and another tape layer which has previously been wound. Accordingly, the layer of the magnetic tape which is currently being wound is apt to move in the direction of tape width, so that the tape edge can be easily trued up by the influence of magnetic force produced by the permanent magnet 19. Because the permanent magnet 19 generates a magnetic field to attract the magnetic tape T toward the apparatus body, one edge of the magnetic tape T is limited by a body-side flange 2a of the take-up tape reel 2 while the magnetic tape T is wound around the take-up tape reel 2. Accordingly, the magnetic tape T is wound in a state that the other edge is arranged at a distance from the other flange 2a of the tape reel 2.

The intensity of magnetic force of the permanent magnet 19 is not limited specifically, but, for example, may be established under consideration of various conditions, such as tape speed, the tension in tape take-up, the kind of magnetic tape T, the distance between the magnet 19 and the magnetic tape T, the taking-up speed (tape running speed), the influence of the magnetic field on the magnetic tape T, and the like. If necessary, magnetic erasing may be performed after the taking-up.

Although the embodiment shows the case where the permanent magnet 19 is fixed at a predetermined place, it is to be understood that the invention is not limited to the embodiment. For example, the permanent magnet 19 may be made movable along the shaft 4 so that the intensity of magnetic force applied to the magnetic tape T may be variable. Although the embodiment shows the case where the permanent magnet 19 is shaped like a doughnut corresponding to the flange of the tape reel 2 so as to completely surround the shaft, it is to be understood that the permanent magnet 19 may be formed so as to partly surround the shaft for applying a magnetic field to the tape T at a part area where the magnetic tape T is rolled around the tape reel 2 and that various modification in the shape thereof can be made.

Although the embodiment shows the case where the permanent magnet 19 is provided at a single side of the tape reel 2, the invention is not limited thereto. For example, a further magnet may be provided opposite to the permanent magnet 19 with respect to the tape reel 2 to pass lines of magnetic force between these magnets. In this case, the direction of force applied to the magnetic tape T becomes very stable because the direction of magnetic line of force at the tape reel 2 perfectly coincides with the axis of the shaft 4. In this case, of course, the intensity of magnetic force of the respective magnet and the positional relation between the respective magnet and the magnetic tape T can be suitably changed in order to bias the magnetic tape toward one side.

Figure 9:
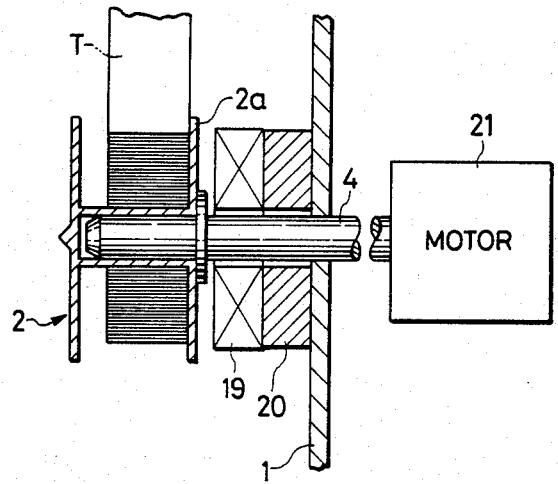
FIG. 9 is a partly enlarged sectional view taken along the reel shaft depicted in FIG. 7.
Figure 10:
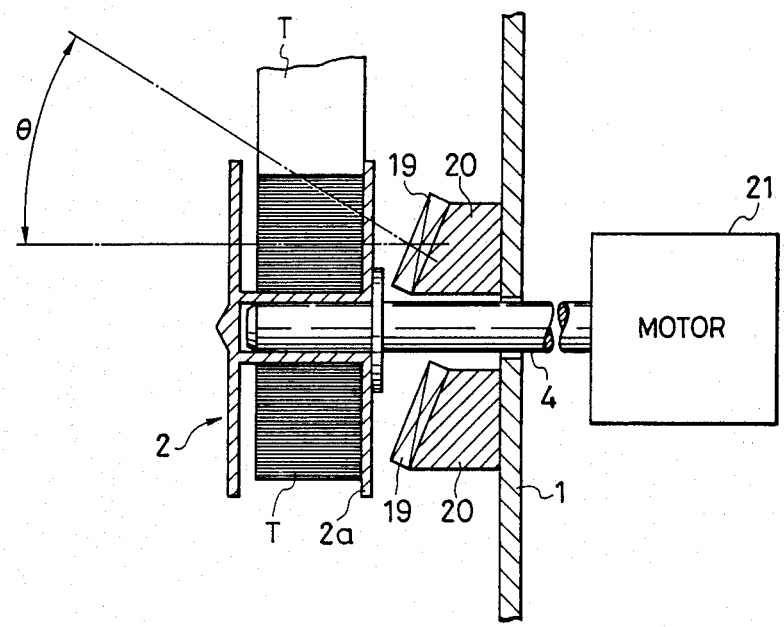
FIG. 10 is a partly enlarged sectional view of another embodiment according to the invention.

FIG. 10 is a schematic view of another embodiment, showing a part corresponding to FIG. 9. In the vicinity of the body side of the tape reel 2, for example, two permanent magnets 19 are supported by supports 20, each of the magnet 19 being inclined at an angle $\theta$ with respect to the axial direction of the tape reel 2. A stable magnetic field acts even on the center portion of the reel and, at the same time, a magnetic field intersecting the tape T in the direction of tape width is generated. Accordingly, the function of stable magnetic force can be secured from the start to the end of tape winding. Preferably, the length of the respective permanent magnet 19 in the radial direction of the tape reel is substantially equal to the thickness of the winding of the tape T. The inclination of such magnets used for neat tape winding has been disclosed in commonly assigned U.S. Patent Application, Ser. No. 008494, filed Jan. 29, 1987.

The angle θ and the intensity of magnetic force are not limited specifically. For example, these can be established under consideration of various conditions, such as tape tension at winding, kind of magnetic tape T, distance between the magnet 19 and the magnetic tape T, winding speed (tape running speed), influence of the magnetic field on the magnetic tape T, and the like, in the same manner as described with respect to the above embodiment. If necessary, magnetic erasing may be made after the winding.

When the magnetic tape T is taken up at the winding part constructed as described above, the magnetic tape T is attracted toward the permanent magnets 19 and wound around the take-up tape reel 2 while one edge of the tape is made come in contact with the lower flange 2a. Furthermore, an attractive force in the direction of the tape thickness acts on adjacent layers of the wound tape, so that frictional force between the adjacent parts of the tape increases. Accordingly, disorder of the tape layers in the direction of the tape width can be prevented. Consequently, the tape rolled around the tape reel 2 can be totally kept in a stable state by the force of magnetic field. Accordingly, with no mechanical contact with the magnetic tape T, a biasing force can be applied to the magnetic tape T having a magnetic material at its surface in the same manner as described in the above embodiment.

Although this embodiment shows the case where the respective permanent magnet 19 is fixed at a predetermined place, it is to be understood that the invention is not limited to the embodiment. For example, the permanent magnet 19 may be made movable both in the direction along the shaft 4 and along the radius of the reel 2 and further made changeable in the inclination angle θ, so that the intensity as well as the direction of magnetic force applied to the magnetic tape T may be made variable.

Although the foregoing description is for the case for the take-up apparatus 1 in which only one magnet is disposed in the vicinity of the shaft 4, the invention is not limited thereto. For example, another magnet may be further disposed near the transport system 8 defining path for the magnetic tape T. This additional magnet would apply its magnetic force to the tape in the direction of tape width to thereby prevent vibration of the magnetic tape T in both the directions of tape width and the tape thickness for the purpose of stabilization of tape running.

The invention is not limited to the aforementioned embodiments but various modifications may be made. For example, the invention is applicable to the case where a wide raw tape is divided into a plurality of raw tapes usable as manufactured articles to be wound on the tape reels. Furthermore, for example, the invention is applicable to a take-up apparatus using flangeless tape reels (having only center part or hub). In the case where flangeless tape reels are used, the magnet is provided so as to apply to the magnetic tape T a magnetic field in the direction along a rotational radius of the reel in the vicinity of the reel. This arrangement, as discussed previously, is disclosed in commonly assigned U.S. Patent Application, Ser. No. 8040. In such an arrangement, the good winding appearance can be secured so that the magnetic tape T does not move in the direction of tape width even in so-called center winding.

Figure 11:
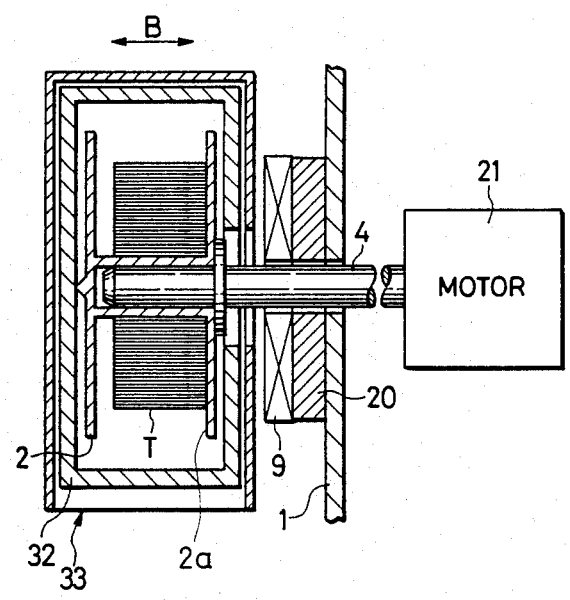
FIG. 11 is a sectional view of in-cassette type of the winding device according to the invention.

Although the embodiments respectively show an open-reel type take-up apparatus, is is a matter of course that the invention is applicable to another type take-up apparatus, for example, an in cassette type take-up apparatus as shown in FIG. 11. FIG. 11 is a sectional view taken along the shaft 4 showing a part of a cassette case 32 which contains a pair of tape reels 2 and is held by a holding mechanism, for example, a cassette holder 33. The mechanism of the cassette holder 33 is not shown in FIG. 11.

Figure 3:
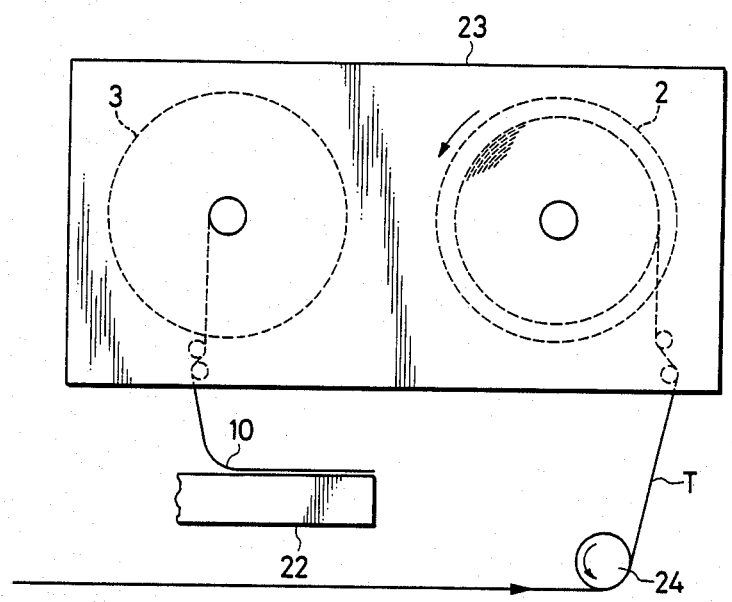
FIG. 3 is a schematic plan view of the conventional tape winding device in accordance with incassette tape winding method.
Figure 4:
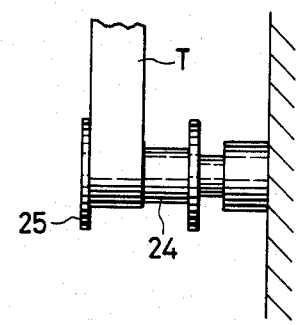
FIG. 4 is a partly enlarged side view of the conventional tape take-up apparatus of FIG. 3.
Figure 5:
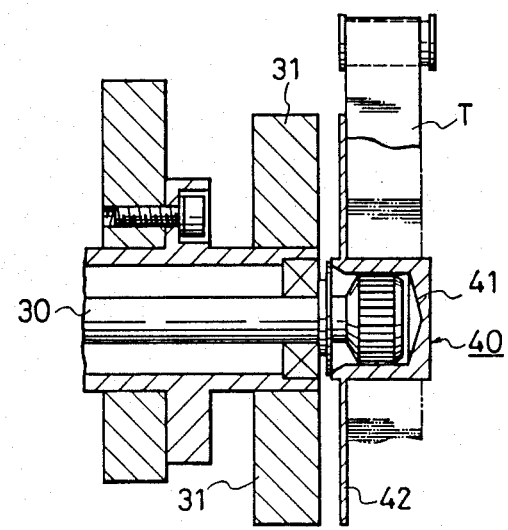
FIG. 5 is a sectional view showing a part of the conventional tape take-up apparatus.

In FIG. 11, the cassette holder 33, for example, having a port for ejecting the cassette case downwards in the drawings, is movable along the shaft 4 (in the direction of arrow B) in the same manner as a conventional cassette holder for the purpose of mounting/demounting of the cassette case 32. A magnet 19 which, for example, is shaped like a doughnut so as to surround the shaft 4 is attached to the lower side of the cassette holder 33 (the panel side of the apparatus body) by a support 20. The winding process in this apparatus is substantially identical with the process of FIG. 3. The use of magnetic alignment with in-cassette winding has been disclosed in commonly assigned U.S. Patent Application, Ser. No. 010516.

When The magnetic tape T is wound by the tape take-up apparatus constructed as described above, the magnetic tape T is wound around the tape reel 2 while being attracted toward the magnet 19 with one edge of the tape being urged to come in contact with one flange 2a (at the right side in the drawing). Accordingly, the appearance of the wound tape improves beyond comparison with the prior art. Furthermore, the magnet 19 used in this embodiment is formed of the same rare-earth material as described in the above embodiment. Accordingly, the magnet has a strong magnetic force even when it is small in size. Accordingly, it is possible to eliminate the disadvantages caused by the fact that the cassette case 32 and the cassette holder 33 are partially interposed between the magnetic tape T and the magnet 19. In short, use of a rare-earth magnet 19 eliminates the double disadvantages that the distance between the magnet 19 and the magnetic tape T is limited by the cassette holder 33 or the like and that the space for installing the magnet 19 is narrow.

Accordingly, the magnet 19 can be easily provided without requiring a complete redesign of this type of take-up apparatus which is conventionally used and, at the same time, the effect of the magnet 19 can be fulfilled.

According to the invention, when a magnetic tape is taken up on a tape reel magnetic, force can be applied to the tape in the direction of width and/or thickness of the tape over a wide range containing the center portion of the tape reel with no mechanical contact with the tape by utilizing a magnetic field. As a result, the tape running can be stabilized and the tape edge can be easily trued up. Consequently, the thus wound magnetic tape can be given a good appearance.

Furthermore, by use of the rare-earth permanent material, the magnet can be made small in size and thin in thickness and can be installed in a conventional tape take-up apparatus. Accordingly, it is possible to eliminate such disadvantages as breakage of the tape, injury of the tape edge, injury of the magnetic surface, and the like.

Moreover, the tape take-up apparatus in accordance with the invention has a very large effect that means for adjusting the condition of the wound tape are not complicated.

In accordance with the invention, consequently, because the magnetic tape can be wound securely and exactly without such disadvantages as injury of the magnetic tape and the like, it is possible to provide a high-quality wound magnetic tape and to improve the manufacturing efficiency of taking-up process.

What is claimed is:

1. A magnetic tape take-up apparatus, comprising,
a tape winding body to which is attached a magnetic tape;
means for rotating said tape winding body, whereby said magnetic tape is wound on said tape winding body; and
at least one rare-earth permanent magnet disposed in a vicinity of said rotating tape winding body for generating a magnetic field passing through said wound tape.

* * * * *